(12) United States Patent
Lippert (10) Patent No.: US 11,494,245 B2
(45) Date of Patent: Nov. 8, 2022

(54) HIGH PERFORMANCE COMPUTING SYSTEM AND METHOD

(71) Applicant: ParTec Cluster Competence Center GmbH, Munich (DE)

(72) Inventor: Thomas Lippert, Aschaffenburg (DE)

(73) Assignee: ParTec Cluster Competence Center GmbH, Munich (DE)

( * ) Notice: Subject to any disclaimer, the term of this patent is extended or adjusted under 35 U.S.C. 154(b) by 0 days.

(21) Appl. No.: 16/335,485

(22) PCT Filed: Oct. 5, 2017

(86) PCT No.: PCT/EP2017/075375
§ 371 (c)(1),
(2) Date: Mar. 21, 2019

(87) PCT Pub. No.: WO2018/065530
PCT Pub. Date: Apr. 12, 2018

(65) Prior Publication Data
US 2019/0243694 A1 Aug. 8, 2019

(30) Foreign Application Priority Data

Oct. 5, 2016 (EP) .................................. 16192430

(51) Int. Cl.
*G06F 9/54* (2006.01)
*G06F 9/50* (2006.01)

(52) U.S. Cl.
CPC ............ *G06F 9/544* (2013.01); *G06F 9/5077* (2013.01); *G06F 9/5083* (2013.01)

(58) Field of Classification Search
CPC .. G06F 9/45558; G06F 9/5077; G06F 9/5083; G06F 9/544
See application file for complete search history.

(56) References Cited

U.S. PATENT DOCUMENTS

2002/0049845 A1 * 4/2002 Sreenivasan ............ H04L 69/40
709/226
2002/0178396 A1 * 11/2002 Wong .................. H04L 41/0853
714/4.11

(Continued)

FOREIGN PATENT DOCUMENTS

EP  1715405 A1  10/2006
JP  201248330 A  3/2012

(Continued)

OTHER PUBLICATIONS

International Search Report for International Application No. PCT/EP2017/075375, dated Nov. 29, 2017.

(Continued)

*Primary Examiner* — Tuan C Dao
(74) *Attorney, Agent, or Firm* — Marshall, Gerstein & Borun LLP (57) ABSTRACT

The present invention relates to the technical field of high performance computing (HPC). In particular, the invention relates to a heterogeneous computing system, particularly a computing system including different modules, which can freely be assigned to jointly process a computation tasks. A control entity, referred to as module computing abstraction layer (MCAL), is provided which allows dynamic assignment of various resources provided by the different modules. Due to its flexibility in adjusting to varying demands in computing, the present invention is also applicable as an underlying system for providing cloud computing services, which provides shared computer processing resources and data to computers and other devices on demand, mostly via the Internet.

13 Claims, 3 Drawing Sheets

(56) References Cited

U.S. PATENT DOCUMENTS

| | | | |
|---|---|---|---|
| 2003/0120792 A1* | 6/2003 | Celik | H04L 12/2812 |
| | | | 709/231 |
| 2005/0038834 A1* | 2/2005 | Souder | G06F 9/5027 |
| 2005/0080982 A1* | 4/2005 | Vasilevsky | G06F 9/50 |
| | | | 711/1 |
| 2009/0071665 A1* | 3/2009 | Shoap | F16L 11/12 |
| | | | 174/15.6 |
| 2013/0048095 A1* | 2/2013 | Wikfors | F04B 23/06 |
| | | | 137/7 |
| 2013/0080559 A1* | 3/2013 | Rao | H04L 67/1097 |
| | | | 709/208 |
| 2013/0124597 A1* | 5/2013 | Diao | G06F 9/5061 |
| | | | 709/201 |
| 2013/0198755 A1 | 8/2013 | Kim et al. | |
| 2013/0282787 A1* | 10/2013 | Lippert | H04L 67/00 |
| | | | 709/201 |
| 2014/0156862 A1* | 6/2014 | Cruz-Aguilar | H04L 67/1002 |
| | | | 709/230 |
| 2014/0181806 A1 | 6/2014 | Abiezzi et al. | |
| 2015/0378406 A1 | 12/2015 | Berghe | |
| 2016/0065492 A1 | 3/2016 | Hu et al. | |
| 2016/0192379 A1* | 6/2016 | Behravan | H04W 76/15 |
| | | | 370/329 |
| 2016/0328399 A1* | 11/2016 | Bolshinsky | G06F 16/24522 |
| 2019/0089574 A1 | 3/2019 | Lippert | |

FOREIGN PATENT DOCUMENTS

| | | |
|---|---|---|
| JP | 2013515991 A | 5/2013 |
| JP | 2013539881 A | 10/2013 |
| JP | 201612347 A | 1/2016 |
| KR | 20130088512 A | 8/2013 |
| KR | 20140018187 A | 2/2014 |
| WO | WO-2005106668 A1 | 11/2005 |
| WO | WO-2011076608 A2 | 6/2011 |
| WO | WO-2012049247 A1 | 4/2012 |

OTHER PUBLICATIONS

Written Opinion of the International Searching Authority for International Application No. PCT/EP2017/075375, dated Nov. 29, 2017.

Eicker Norbert et al., The Deep Project—Pursuing Cluster-Comuting in the Many-Core Era, International Conference on Parallel Processing, Oct. 1, 2013.

Eicker Norbert et al., The Deep Project an Alternative Approach to Heterogeneous Cluster-Computing in the Many-Core Era, Concurrentcy and Computation: Practice and Experience, Jul. 27, 2015.

* cited by examiner

HIGH PERFORMANCE COMPUTING SYSTEM AND METHOD

CROSS-REFERENCE TO RELATED APPLICATIONS

This is the United States national phase of International Patent Application No. PCT/EP2017/075375, filed Oct. 5, 2017, which claims priority to European Patent Application No. 16192430.3, filed Oct. 5, 2016, the entire contents of each of which are hereby incorporated herein by reference.

FIELD OF THE DISCLOSURE

The present invention relates to the technical field of high performance computing (HPC). In particular, the invention relates to a heterogeneous computing system, particularly a computing system including different modules, which can freely be assigned to jointly process a computation tasks. A control entity, referred to as module computing abstraction layer (MCAL), is provided which allows dynamic assignment of various resources provided by the different modules. Due to its flexibility in adjusting to varying demands in computing, the present invention is also applicable as an underlying system for providing cloud computing services, which provides shared computer processing resources and data to computers and other devices on demand, mostly via the Internet.

BACKGROUND

Applications for HPC systems cover a wide technical area. From simulating the human brain over weather and climate prediction, computational fluid engineering, seismic imaging, radio astronomy to data analysis, just to name a few. The demand for high performance computing is ever increasing.

Currently, the predominant HPC architectures are cluster computers and massive parallel processing (MPP) systems. Cluster computers include a plurality of cluster nodes, which communicate with each other using standard network technology. The individual cluster nodes are equipped with off-the-shelf general purpose processors. In MPP (massively parallel processing) systems, a large number of processors perform computations simultaneously, hence, in parallel. They normally also employ off-the-shelf general purpose processors. The processors, however, tend to use proprietary network technology and particularly adapted software for the communication.

In order to satisfy the thirst for more and more computation power, the number of cluster nodes in computer clusters and processors in MPP systems increased massively in recent years. However, it can already be seen that just using off-the-shelf general purpose processors and increasing its number in a system is not a solution.

Off-the-shelf general purpose processors have without any doubt positive aspects. Their single thread performance is high. They have large memory per processor or core in case of a multi-core processor. Standard programming can be used, which makes it easier to port applications to such systems. However, the technology is reaching its limits. If it comes to off-the-shelf general purpose processors, their clock rate (frequency) has practically not increased in the last decade. This is closely connected to the energy consumption, which should not go far beyond 100 watt per chip before it gets critical, in particular with cooling the system. Additionally, those processors are comparably expensive and have low energy efficiency.

A solution is seen in employing accelerators, which can be used to compute those parts of an application that is highly scalable. Highly scalable is an application if it can handle larger loads by adding more resources in a more cost effective way. The sequential part in the code, which cannot be computed in parallel, is normally one of the most crucial limiting factors for scalability.

Systems using more than one kind of processor are referred to as heterogeneous computer systems. Different accelerators can be used in combination with general purpose processors, namely many core processor and GPUs (Graphics Processing Unit). Many core processors have 50 plus cores. GPUs have hundreds of simple computing cores. Both types of processors are energy efficient.

In heterogeneous computer systems, each cluster node is equipped with accelerators, formed by one or more multi-core processors or GPUs. The accelerator basically functions as a coprocessor supplementing the functions of the cluster node's primary processor. The cluster nodes communicate via a fabric in which components pass data to each other through interconnecting switches. The term "fabric" is one used in the field of high performance computing to refer to a system topology. The term interconnect is also used for the communication infrastructure between the cluster nodes, referring to an electrical or optical connection or cable that connects separate devices. The major problem of attaching an accelerator to each node is the static assignment. The ratio between the general purpose processor and the GPU is fixed when the system is designed.

The international application WO2012-049247A1 tackles this shortcoming with a computer cluster arrangement and a method for operation of the introduced computer cluster arrangement. The computer cluster arrangement comprises computation nodes CN, which dynamically outsource specific computation tasks to boosters B. Therefore, an assignment technique of boosters B to computation nodes CN is introduced. The assignment takes dynamically place at run-time. In this architecture cluster nodes and accelerator nodes, which form the booster, are put into one fabric. This is more flexible in comparison to the accelerated cluster nodes since the assignment of the booster to cluster nodes for accelerating processing can be done when starting a process. This arrangement is further described by Norbert Eicker et al. in "The DEEP project Pursuing cluster-computing in the many-core era", 42nd International Conference on Parallel Processing, pp 885-892, 2013, and "The DEEP Project An alternative approach to heterogenous cluster-computing in the many-core era", Concurrency and Computation: Practice and Experience, 28, pp 2394-2411. 2015.

When one application is computed by a heterogeneous system, such as the cluster booster type, the individual computation tasks not only need to be processed on multiple different cluster nodes, but also on two different architectures, namely the computer cluster and the accelerator. An efficient communication between the cluster computer and the booster as well as within the cluster computer and within the booster must be ensured. Additionally, the increasing number of components causes the risk that components fail, even with a high reliability of the individual parts. So the system must ensure a high resiliency, i.e. the ability to withstand failure of individual components and yet remain functional.

GENERAL DESCRIPTION

The present invention provides modular computing systems. A modular computing system includes different modules, such as a cluster module, and booster module, a storage module, a neuromorphic module, a data analytic module, a graphics module, a quantum computing module etc. Each module might include a plurality of nodes. The cluster module includes a plurality of cluster nodes, the booster module includes a plurality of booster nodes, and the storage module includes a plurality of storage nodes, and so on.

The individual nodes are either all connected to one fabric. Different modules may have different interconnects. The cluster module uses e.g. an InfiniBand interconnect, whereas the booster module uses an Intel Omni-Path fabric, which is connected to the InfiniBand interconnect via special interface nodes. The same applies to the other types of modules.

In order to combine the different modules to one system a modular computing abstraction layer (MCAL) is provided. The MCAL provides communication functionality and management functionality. The Para Station by Par Tec Cluster Competence Center GmbH could form a starting point for realizing MCAL having the functionality and properties described in the following.

The MCAL allows communication within a module, referred to as intra module communication, and between modules, referred to as inter module communication. In order to do so, MCAL provides interfaces to the respective fabrics, e.g., one fabric for entire system or specialized fabric per module, such as InfiniBand for cluster module and Intel Omni-Path fabric for the booster module. Other interconnects are also possible such as Ethernet, 10G, Gigabit or shared memory communication. MCAL can use any kind of communication and selects the particular way of communication based on availability, indications by the application program, performance or cost considerations.

Shared memory communication provides a very fast and efficient way for two or more processes to communicate. Different types of shared memory communication can be employed by MCAL. In case two or more processes of a parallel task run on the same physical node having shared memory, this shared memory can be used for shared memory communication between these processes. This is typically possible on SMP nodes, where one process per CPU is spawned. Symmetric multiprocessing (SMP) refers to an architecture where two or more identical processors connect to a single, shared main memory. Since MCAL has the knowledge about the processes and on which node they are processed, MCAL can set up shared memory communication in such a situation.

However, shared memory communication is not limited to SMP situations. In case processes run on different nodes within one module or even on nodes belonging to different modules, MCAL sets up shared virtual address space communication. Using shared virtual address space communication, larger messages are conveyed between nodes by just sharing meta data of the message and the virtual address of the data itself. The actual message can be accessed by the process via its assigned virtual address space. This allows fast communication. MCAL sets up a virtual address space communication by setting up a memory region, which is directly shared by the processes or nodes involved in the communication.

As can be seen from those examples the MCAL not only provides the communication functionality, but also selects the way to communicate, which increases performance and efficiency. MCAL can e.g. decides which interconnect can be used for communication while spawning processes, i.e., creating and executing new child processes. At the same time MCAL monitors the current process and observes the child process to terminate or may continue to execute asynchronously.

The second major function MCAL provides is management. The management function covers different aspects, namely node management, module management, process management and resource management.

Node management is directed to the individual nodes, such as the cluster nodes in a cluster module, the booster nodes in a booster module, the storage nodes in a storage module and so on regarding other types of modules, as named above, which are present in the system. MCAL first of all detects usable nodes. Usable nodes are those ready to be used. This includes that MCAL is configured to identify malfunctioning nodes or nodes close to fail, e.g. based on system parameters, such as temperature, available memory, etc. and the variation of those properties over time. MCAL therefore implements fault tolerance and thereby ensures high resiliency.

This is done by MCAL employing the concept of virtual nodes. The virtual nodes represent actual hardware, such as cluster nodes, booster nodes, storage nodes, etc. but MCAL has the freedom to dynamically map the nodes. For example, if an application requires X cluster nodes, Y booster nodes and Z storage nodes (X, Y, Z being integer numbers). MCAL can provide those nodes out of all available resources. In case a node is failing or added to the system, MCAL can react quickly by just changing the mapping between the virtual nodes and the physical nodes. Malfunctioning nodes can be taken out of the list of available nodes without making the entire system fail.

MCAL has also the ability to select particular nodes depending on factors like reachability, latency or physical placement. This can be done completely transparently to the running application.

The MCAL has the overall system view and constantly keeps the state of each node and each interconnect up to date. MCAL is informed at all times about particular properties of each node and interconnect, such as number of available CPUs per node, running services, available storage, interconnect bandwidth, free memory, temperature, system clock rate etc.

Another function is module management. Module management is similar to node management, and might include node management for a particular module, but takes into consideration module specific aspect. Module management focuses on module specific aspects, such as the state of interface nodes, if provided, via which the module communicates to others. Similar to nodes, MCAL monitors the module's state in order to allow increased utilization of the module.

MCAL is also responsible for process management. Each running application is divided into a plurality of individual processes, which need to be started, distributed and monitored. At the same time resources need to be assigned, which correspond to the need of the process for computation power and storage. If the process requires a particular processing, MCAL assigns one or more booster nodes or even more specific nodes such as neuromorphic nodes, data analytic nodes, graphics nodes or quantum computing nodes from the respective modules.

In order to do so, MCAL is configured to recognize and control dependencies between processes and their requirements. Based on this, MCAL creates processes on nodes, in case of a booster module or cluster module, or assigns storage in case of a storage module. Processes are monitored and dependent processes are treated as group, allowing to quickly responding to errors occurring in any one of a parallel task. This allows that processes are re-started immediately so that the overall delay for the running application is minimized.

Resource management is another task MCAL performs in the modular computing system. As part of resource management MCAL realizes off-loading mechanism, i.e. processes, which are e.g. running on a cluster module, might need some booster nodes from the booster module. In such a case MCAL can spawn processes on selected booster nodes, in order to run the task in parallel.

As part of the off-loading not just one process running on one booster may be created, but multiple processes, which are directly communicating with each other using the modules communication fabric without the need for the host processor to interfere.

The resource management also ensures reducing memory consumption, e.g. by reducing the number of connections between different processes. This is done by using on-demand connections, which are only actually established, when needed. This drastically reduces memory consumption per connection. So, not only resources such as nodes are treated in a virtual fashion, but virtual assignment is also applied to physical networks.

When assigning resources, MCAL does not only take into consideration the request by one process, but other processes as well. This allows to flexibly responding to changes of communication infrastructure based on the integrated control.

Integrated control is another functional aspect provided by MCAL. Integrated control refers to the usage of information gathered by MCAL from its management function for controlling communication and vice versa. Hence, communication function and management function is not separate but integrated in order to further optimize the overall system performance.

MCAL's knowledge about all different aspects of all nodes in all modules and the status of all interconnects, intra module communication and inter module communication is used to run the system. This allows to dynamically adjusting to changing behavior of the system as well as to changing demand of the application running on the system.

The integrated control does not only take into consideration the actual system state and application demands, but also predicts upcoming requests for module or interconnect usage.

The information of the system state is used for dynamic assignment of nodes. This includes that the assignment of resources is done using a feedback loop registering system wide impact of assignment decisions, so that future assignments adjust correspondingly. The system also stores such information to improve assignment decisions for future cases, in a self-learning fashion.

Even if the main part of application normally starts on the cluster module, MCAL identifies which part of the application to run on the cluster module or the booster module. Basis for the decision are e.g. indications by the application code itself, of the observation of the codes performance while running. This allows adjustments to the assignment during the computing of the application.

As to the implementation of MCAL, MCAL is distributed over the entire system and it includes node managers (NM) implemented on each node. Node managers can be implemented in hardware, or software, e.g. as daemon processes running on the respective nodes. Node managers constantly gather information in order to build a global view on modules and the entire system. Applications running on system can benefit from this information by communication with the management function or directly with individual node managers. This is realized by particular interface, which can be hardware or an API (application programming interface). So, not only that MCAL gets input from applications, but applications benefit from information gathered by MCAL via the individual node managers.

The communication traffic of node managers is strictly separated from intra and inter module communication. This allows the intra and inter module communication to run with high speed uninterrupted by management functions. Furthermore, system security can further be enhanced by such separation.

The use of the actual communication network is controlled by MCAL, which provides such functionality to the application via message passing interface (MPI). Part of MCAL is an MPI stack for each module as well as a system wide global MPI. Individual MPIs are realized e.g. for the computer cluster module, the booster module, storage module etc.

MCAL's communication uses an administration network. The administration network can be the same or a different physical network than the physical network used for intra and inter module communication. For example, the intra and inter module communication can be InfiniBand, Myrinet etc. and the administration network can be formed by Ethernet connecting the node managers.

Special nodes can be included in the system for providing a front end allowing administrative tasks or control functions to run the system. The front-end does not need to be connected to the communication network, but just to the communication network. Via the front-end node, which could be formed e.g. by a work station computer, a personal computer (PC) a laptop computer or any smart computing device, the modular computing system can be administrated. Applications running on the modular computing systems can be scheduled, started, stopped and monitored. This can be done by batch processing, i.e. by executing a series of jobs on the modular computing system without manual intervention, hence, non-interactive.

Besides running a series of jobs on the modular computing system without manual intervention, MCAL may provide interactive computing, in which the application running on the modular computing system accepts input from humans as it runs. This input may be provided via a work station computer, a personal computer (PC) a laptop computer or any smart computing device. In such a scenario the modular computing system is accessible via e.g. the laptop computer, appearing as the laptop computer would have the computation power of the modular computing system. This is very useful for real time applications, which must respond within a time frame that the user senses as immediate or current. Also Big Data applications, which make voluminous amount of structured, semi structured and unstructured data accessible for mining information, can make use of such an arrangement. This is also true for cloud computing services having the modular computing system as an underlying resource for the provision of computation power and storage.

The tight integration between MCAL and the system allows lower communication latency and improve communication in the described modular computing system.

DETAILED DESCRIPTION

Figure 1:
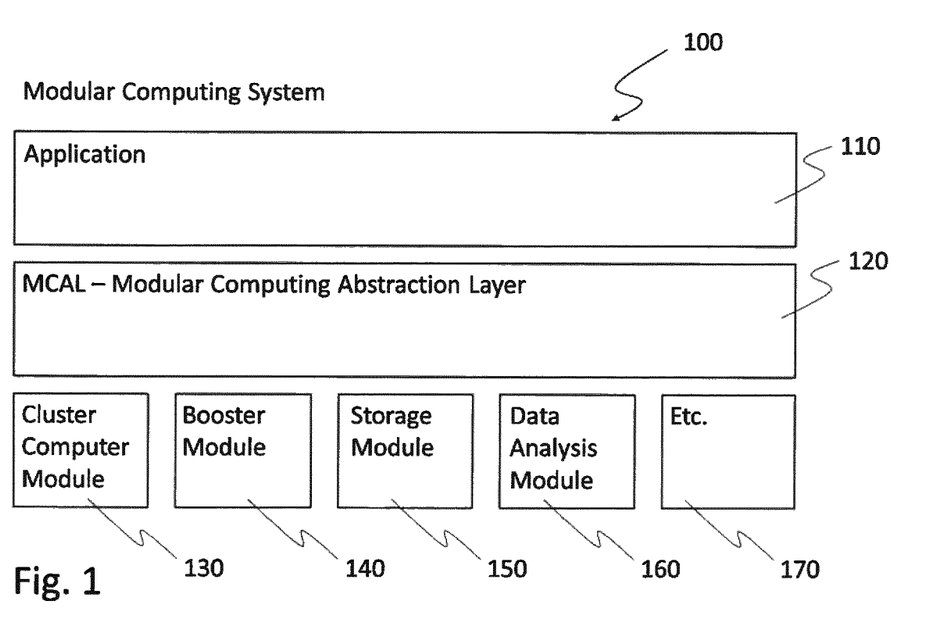
FIG. 1 shows a functional view of a modular computing system according to the present invention.

FIG. 1 shows the functional view of a modular computing system 100 according to the present invention. An application layer 110 forms the top of the modular computing system. In the application layer application programs, such as software programs may be executed in the modular computing system 100. A modular computing abstraction layer 120 (MCAL) is provided, in order to allow the application layer 110 to access the system's resources. The system's resources are formed by various modules, such as the cluster module 130, the booster module 140, the storage module 150, the data analysis module 160 and other modules 170, e.g. one or more from the following group of modules: a neuromorphic module, a graphics module, a quantum computing module. It is also possible to have multiple modules of the same kind.

The MCAL 120 allows communication within a module, referred to as intra module communication, and between modules, referred to as inter module communication. MCAL 120 can use any kind of communication and selects the particular way of communication based on availability, indications by the application program, performance or cost considerations.

Additionally MCAL 120 provides management function. The management function covers different aspects, namely node management, module management, process management and resource management. Node management is directed to the individual nodes and will be explained further with reference to FIGS. 2 and 3.

The MCAL 120 has the overall system view and constantly keeps the state of each module 130, 140, 150, 160 and 170 up to date. MCAL 120 is informed at all times about particular properties of module 130, 140, 150, 160 and 170, such as number of available processors, running services, available storage, interconnect bandwidth, free memory, temperature, system clock rate etc. Another function MCAL 120 provides is module management. Module management takes into consideration module specific aspect. Hence, MCAL includes functions specially adapted to manage the cluster module 130, the booster module 140, the storage module 150, the data analysis module 160 and other modules 170. MCAL 120 is also responsible for process management. Each running application 110 is divided into a plurality of individual processes, which need to be started, distributed and monitored. At the same time resources need to be assigned, which correspond to the need of the process for computation power and storage. If the process requires a particular processing, MCAL 120 assigns one or more booster nodes or even more specific nodes such as neuromorphic nodes, data analytic nodes, graphics nodes or quantum computing nodes from the respective modules. In order to do so, MCAL 120 is configured to recognize and control dependencies between processes and their requirements. Resource management is another task MCAL 120 performs in the modular computing system. As part of resource management MCAL 120 realizes off-loading mechanism, i.e. processes, which are e.g. running on a cluster module 130, might need some booster nodes from the booster module 140. In such a case MCAL 120 can spawn processes on selected booster nodes from the booster module 140, in order to run the task in parallel.

Integrated control is another functional aspect provided by MCAL 120. Integrated control refers to the usage of information gathered by MCAL 120 from its management function for controlling communication and vice versa. Hence, communication function and management function is not separate but integrated in order to further optimize the overall system performance. This allows to dynamically adjusting to changing behavior of the system as well as to changing demand of the application running on the system. The integrated control does not only take into consideration the actual system state and application demands, but also predicts upcoming requests for module or interconnect usage.

Figure 2:
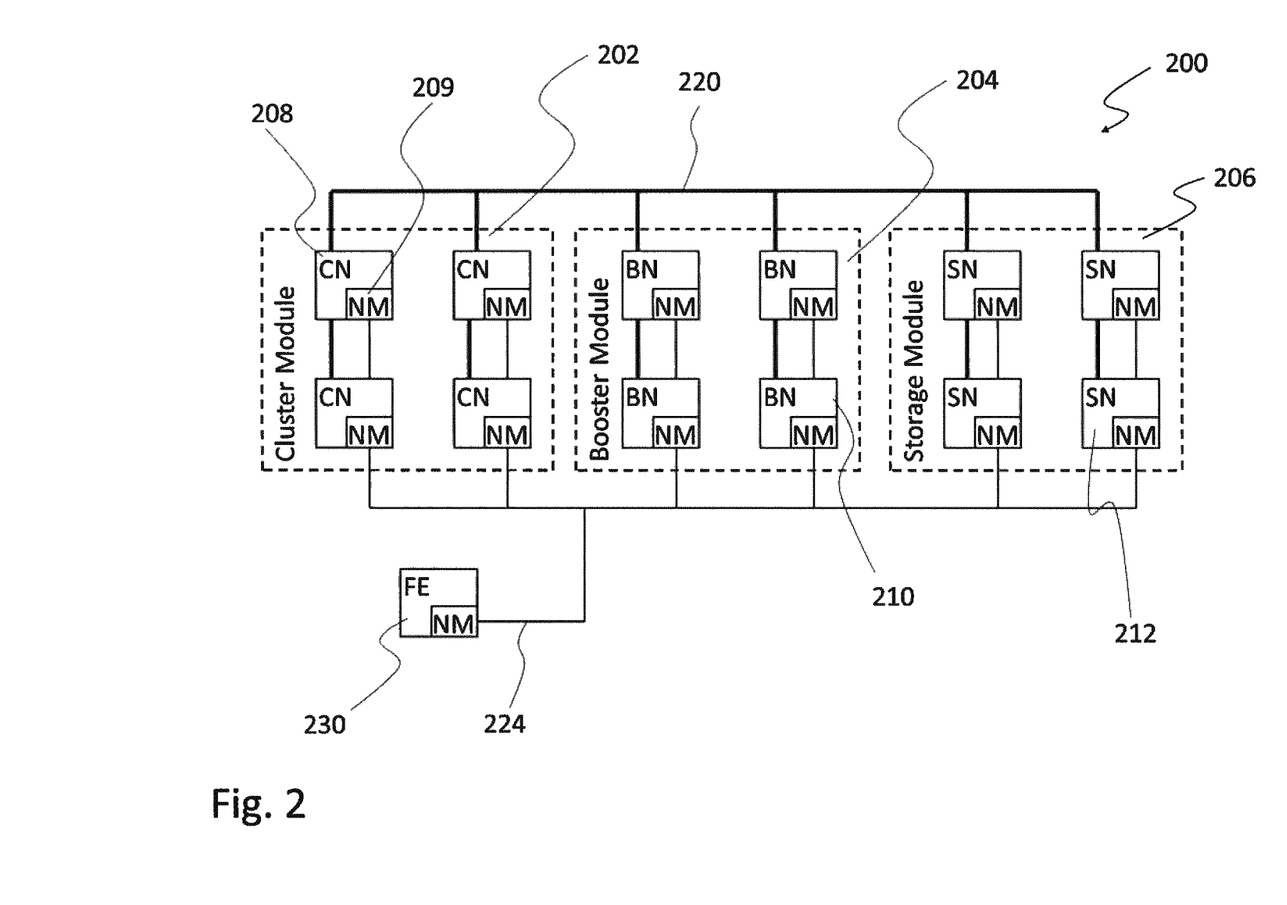
FIG. 2 shows a first embodiment of a modular computing system according to the present invention.

FIG. 2 shows a first embodiment of a modular computing system 200 according to the present invention. The modular computing system 200 includes a cluster module 202, a booster module 204 and a storage module 206.

The cluster module 202 includes a plurality of cluster nodes 208 (CN). On each cluster node 208 a node manager 209 (NM) is provided, which in cooperation with other node managers 209 provides communication and management functionality to the modular computing system 200. The booster module 204 includes a plurality of booster nodes 210 (BN). On each booster node 210 a node manager 209 is provided, which in cooperation with other node managers 209 provides communication and management functionality to the modular computing system 200. The storage module 206 includes a plurality of storage nodes 212 (SN). On each storage node 212 a node manager 209 is provided, which in cooperation with other node managers 209 provides communication and management functionality to the modular computing system 200.

The cluster node may be formed by a computer having a general purpose micro processor, such as an Intel Xeon processor, memory, interfaces, such as network cards. The booster nodes might be formed by processing systems equipped with GPUs or many core processors, memory and interfaces, such as network cards. The storage nodes include memory, which can be RAM (random access memory) and non-volatile memory, such as flash memory, SSD (solid state disk), hard disk, further the storage node includes a node controller, such as a microprocessor and interfaces, such as network cards.

Two different networking infrastructures are provided. Firstly, there is a communication network 220 connecting all nodes 208, 210, 212 with each other, so that the cluster nodes 208 and the booster nodes 210 and the storage nodes 212 can communicate.

Secondly, an administration network 224 is provided connecting all node managers 209 provided in the various nodes 208, 210, and 212. Attached to the administration network 224 is a front-end 230 which allows controlling the entire modular computing system. The front-end 230 also includes a node manager 209, which performs the actual communication to the other node managers 209.

In order to combine the different modules to one system a modular computing abstraction layer (MCAL) is provided as described with reference to FIG. 1. The MCAL provides communication functionality and management functionality. The ParaStation by ParTec Cluster Competence Center GmbH could form a starting point for realizing MCAL having the functionality and properties described here.

The MCAL is implemented by the node managers 209 on the individual nodes and allows communication within a module, referred to as intra module communication, and between modules, referred to as inter module communication. In order to do so, the node managers provide interfaces to the respective fabrics, e.g., one fabric for entire system or specialized fabric per module, such as InfiniBand for cluster module 202 and Intel Omni-Path fabric for the booster module 204. Other interconnects are also possible such as Ethernet, 10G, Gigabit or shared memory communication. The node managers 309 can use any kind of communication and selects the particular way of communication based on availability, indications by the application program, performance or cost considerations.

Shared memory communication and shared virtual address space communication can be employed, which provide a very fast and efficient way for two or more processes to communicate.

The node managers 209 collectively provide node management. Node management is directed to the individual nodes, such as the cluster nodes 208 in a cluster module 202, the booster nodes 210 in a booster module 204, the storage nodes 212 in a storage module 206.

Furthermore, the node managers 209 also select particular nodes depending on factors like reachability, latency or physical placement. This can be done completely transparently to the running application. They gather and exchange information about the overall system and constantly keep the state of each node and each interconnect up to date. This allows the node managers 309 to be informed at all times about particular properties of each node and interconnect, such as number of available CPUs per node, running services, available storage, interconnect bandwidth, free memory, temperature, system clock rate etc.

Another function implemented by the node managers is module management. Module management is similar to node management, and might include node management for a particular module, but takes into consideration module specific aspect. Module management focuses on module specific aspects, such as the state of interface nodes, if provided, via which the module communicates to others. Similar to nodes, the node managers 309 monitors the module's state in order to allow increased utilization of the module.

Resource management is another task the node managers 209 perform in the modular computing system 200. As part of resource management they realize off-loading mechanism, i.e. processes, which are e.g. running on a cluster module 202, might need some booster nodes 210 from the booster module 204. In such a case a node manager can spawn processes on selected booster nodes 210, in order to run the task in parallel.

Integrated control is another functional aspect implemented by the node managers. Integrated control refers to the usage of information gathered by the node managers from its management function for controlling communication and vice versa. Hence, communication function and management function is not separate but integrated in order to further optimize the overall system performance.

The node managers' 209 knowledge about all different aspects of all nodes in all modules and the status of all interconnects, intra module communication and inter module communication is used to run the system. This allows to dynamically adjusting to changing behavior of the system as well as to changing demand of the application running on the system.

The integrated control does not only take into consideration the actual system state and application demands, but also predicts upcoming requests for module or interconnect usage.

Node managers 209 can be implemented in hardware, or software, e.g. as daemon processes running on the respective nodes. Node managers 209 constantly gather information in order to build a global view on modules and the entire system. Applications running on system can benefit from this information by communication with the management function or directly with individual node managers 209. This is realized by particular interface, which can be hardware or an API (application programming interface).

The communication traffic of node managers 209 is strictly separated from intra and inter module communication. This allows the intra and inter module communication to run with high speed uninterrupted by management functions. Furthermore, system security can further be enhanced by such separation.

The use of the actual communication network 220 is controlled by the node managers 209, which provide such functionality to the application via message passing interface (MPI).

Node managers 209 communicate with each other using the administration network 224. The administration network 224 can be the same or a different physical network than the physical network used for intra and inter module communication, here referred to as communication network 220. For example, the intra and inter module communication can be InfiniBand, Myrinet etc. and the administration network can be formed by Ethernet connecting the node managers 209.

Special nodes can be included in the system for providing a front-end 230 allowing administrative tasks or control functions to run the system. The front-end does not need to be connected to the communication network 220, but just to the communication network 220. Via the front-end node, which could be formed e.g. by a work station computer, a personal computer (PC) a laptop computer or any smart computing device, the modular computing system 200 can be administrated. Applications running on the modular computing system 200s can be scheduled, started, stopped and monitored. This can be done by batch processing, i.e. by executing a series of jobs on the modular computing system 200 without manual intervention, hence, non-interactive.

Besides running a series of jobs on the modular computing system 200 without manual intervention, node managers 309 may provide interactive computing, in which the application running on the modular computing system 200 accepts input from humans as it runs. This input may be provided via a work station computer, a personal computer (PC) a laptop computer or any smart computing device. In such a scenario the modular computing system 200 is accessible via e.g. the laptop computer, appearing as the laptop computer would have the computation power of the modular computing system 200. This is very useful for real time applications, which must respond within a time frame that the user senses as immediate or current. Also Big Data applications, which make voluminous amount of structured, semi structured and unstructured data accessible for mining information, can make use of such an arrangement. This is also true for cloud computing services having the modular computing system 200 as an underlying resource for the provision of computation power and storage.

Figure 3:
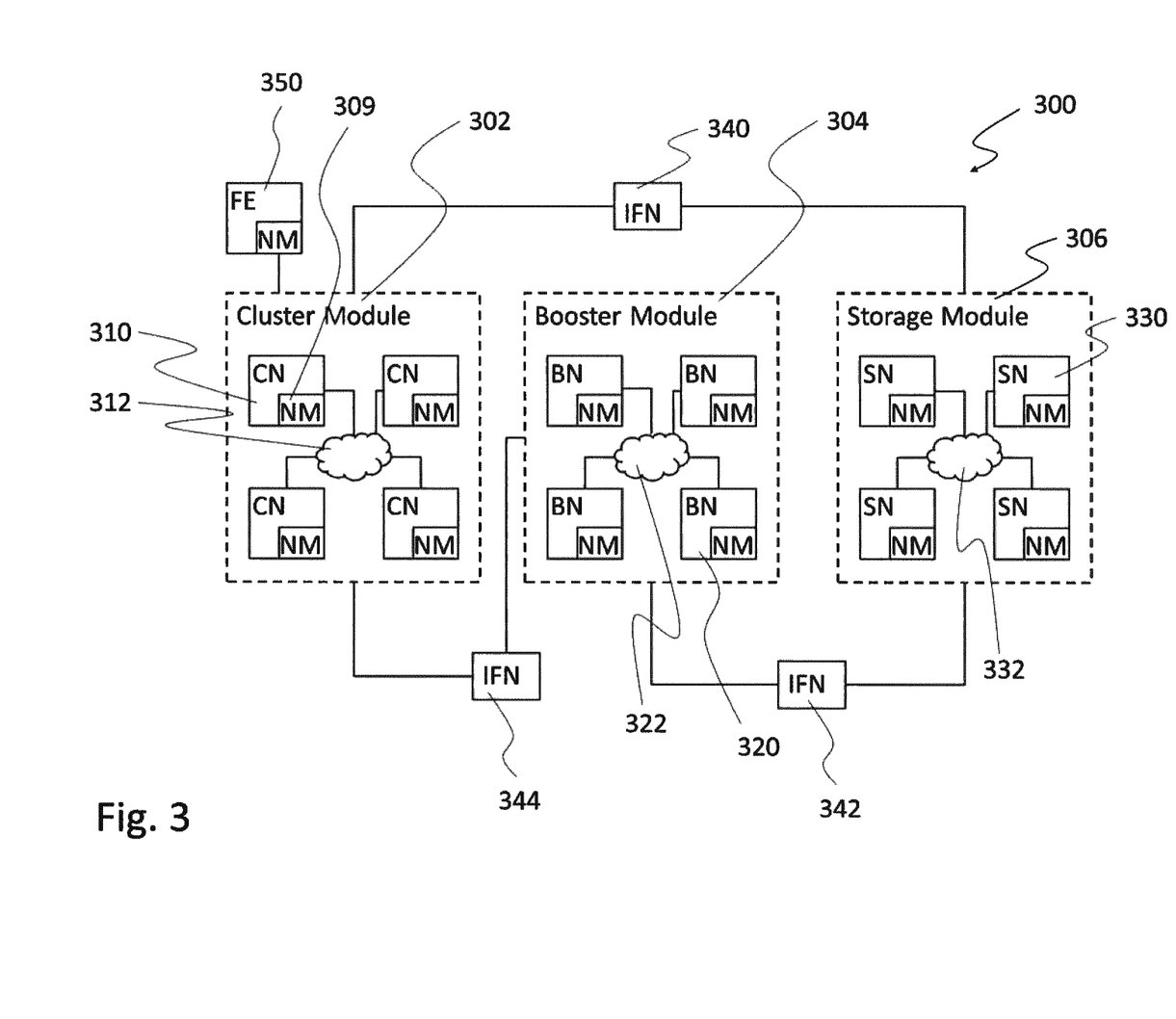
FIG. 3 shows a second embodiment of a modular computing system according to the present invention.

FIG. 3 shows a second embodiment of a modular computing system 300 according to the present invention. The modular computing system 300 includes a cluster module 302, a booster module 304 and a storage module 306.

The cluster module 302 includes a plurality of cluster nodes 310 (CN). On each cluster node 310 a node manager 309 (NM) is provided, which in cooperation with other node managers 309 provides communication and management functionality to the modular computing system 300. The cluster nodes 310 are connected to each other via a cluster interconnect 312.

The booster module 304 includes a plurality of booster nodes 320 (BN). On each booster node 320 a node manager 309 is provided, which in cooperation with other node managers 309 provides communication and management functionality to the modular computing system 300. The booster nodes 320 are connected to each other via a booster interconnect 322.

The storage module 306 includes a plurality of storage nodes 330 (SN). On each storage node 330 a node manager 309 is provided, which in cooperation with other node managers 309 provides communication and management functionality to the modular computing system 300. The storage nodes 330 are connected to each other via storage interconnect 332.

The cluster node may be formed by a computer having a general purpose micro processor, such as an Intel Xeon processor, memory, interfaces, such as network cards. The booster nodes might be formed by processing systems equipped with GPUs or many core processors, memory and interfaces, such as network cards. The storage nodes include memory, which can be RAM (random access memory) and non-volatile memory, such as flash memory, SSD (solid state disk), hard disk, further the storage node includes a node controller, such as a microprocessor and interfaces, such as network cards.

The cluster module 302 can communicate with the storage module 306 via an interface node 340 connecting the cluster interconnect 312 with the storage interconnect 332. The storage module 306 can communicate with the booster module 304 via an interface node 342 connecting the storage interconnect 332 with the booster interconnect 322. The booster module 304 can communicate with the cluster module 302 via an interface node 344 connecting the booster interconnect 322 with the cluster interconnect 312.

The cluster module 302 uses e.g. an InfiniBand interconnect, whereas the booster module 304 uses an Intel Omni-Path fabric, which is connected to the InfiniBand interconnect via the interface node 344. Each interface node may be formed by a plurality of nodes in order to increase performance and throughput. The same applies to the other types of modules.

All node managers 309 provided in the various nodes 310, 310, 312 are using the same communication infrastructure. Attached to the cluster interconnect 312 is a front-end 350 which allows to control the entire modular computing system. The front-end 350 also includes a node manager 309, which performs the actual communication to the other node managers 309.

In order to combine the different modules to one system a modular computing abstraction layer (MCAL) is provided as described with reference to FIG. 1. The MCAL provides communication functionality and management functionality. The ParaStation by ParTec Cluster Competence Center GmbH could form a starting point for realizing MCAL having the functionality and properties described in the following.

MCAL is implemented by the node managers 309 in each node, which can use for process to process communication any kind of communication link provided.

As aforementioned, the node managers 309 also provide node management. Node management is directed to the individual nodes, such as the cluster nodes 310 in a cluster module 302, the booster nodes 320 in a booster module 304, the storage nodes 330 in a storage module 306. The node managers 309 also have the ability to select particular nodes depending on factors like reachability, latency or physical placement. This can be done completely transparently to the running application. They always have overall system view and constantly keeps the state of each node and each interconnect up to date. The node managers 309 inform each other at all times about particular properties of each node and interconnect, such as number of available CPUs per node, running services, available storage, interconnect bandwidth, free memory, temperature, system clock rate etc.

Another function they implement is module management. Module management is similar to node management, and might include node management for a particular module, but takes into consideration module specific aspect. Module management focuses on module specific aspects, such as the state of interface nodes, if provided, via which the module communicates to others.

The node managers 309 also implement process management. Each running application is divided into a plurality of individual processes, which need to be started, distributed and monitored. At the same time resources need to be assigned, which correspond to the need of the process for computation power and storage. They are configured to recognize and control dependencies between processes and their requirements. Based on this, the node managers 309 creates processes on nodes, in case of an booster module 304 or cluster module 302, or assigns storage in case of a storage module 306. Processes are monitored and dependent processes are treated as group, allowing to quickly responding to errors occurring in any one of a parallel task. This allows that processes are re-started immediately so that the overall delay for the running application is minimized.

Resource management is another task the node managers 309 implement in the modular computing system 300. As part of resource management they realize off-loading mechanism, i.e. processes, which are e.g. running on a cluster module 302, might need some booster nodes 320 from the booster module 304. In such a case the node manager 309 spawn processes on selected booster nodes 320, in order to run the task in parallel.

As part of the off-loading not just one process running on one booster may be created, but multiple processes, which are directly communicating with each other using the modules communication fabric without the need for the host processor to interfere.

The resource management also ensures reducing memory consumption, e.g. by reducing the number of connections between different processes. This is done by using on-demand connections, which are only actually established, when needed. This drastically reduces memory consumption per connection. So, not only resources such as nodes are treated in a virtual fashion, but virtual assignment is also applied to physical networks.

When assigning resources, the node managers 309 do not only take into consideration the request by one process, but other processes as well. This allows to flexibly responding to changes of communication infrastructure based on the integrated control.

Integrated control is another functional aspect provided by the node managers 309. Integrated control refers to the usage of information gathered by the node managers from its management function for controlling communication and vice versa. Hence, communication function and management function is not separate but integrated in order to further optimize the overall system performance.

The node managers' knowledge about all different aspects of all nodes in all modules and the status of all interconnects, intra module communication and inter module communication is used to run the system. This allows to dynamically adjusting to changing behavior of the system as well as to changing demand of the application running on the system.

The integrated control does not only take into consideration the actual system state and application demands, but also predicts upcoming requests for module or interconnect usage. The information of the system state is used for dynamic assignment of nodes. This includes that the assignment of resources is done using a feedback loop registering system wide impact of assignment decisions, so that future assignments adjust correspondingly. The system also stores such information to improve assignment decisions for future cases, in a self-learning fashion.

Even if the main part of application normally starts on the cluster module 302, the node managers identify which part of the application to run on the cluster module 302 or the booster module 304. Basis for the decision are e.g. indications by the application code itself, of the observation of the codes performance while running. This allows adjustments to the assignment during the computing of the application.

Node managers 309 can be implemented in hardware, or software, e.g. as daemon processes running on the respective nodes. Node managers 309 constantly gather information in order to build a global view on modules and the entire system. Applications running on system can benefit from this information by communication with the management function or directly with individual node managers 309. This is realized by particular interface, which can be hardware or an API (application programming interface).

The communication traffic of node managers is strictly separated from intra and inter module communication. This allows the intra and inter module communication to run with high speed uninterrupted by management functions. Furthermore, system security can further be enhanced by such separation.

The use of the actual communication network is controlled by node managers 309, which provides such functionality to the application via message passing interface (MPI). The node managers 309 uses an administration network (not shown). The administration network (not shown) can be the same or a different physical network than the physical network used for intra and inter module communication. For example, the intra and inter module communication can be InfiniBand, Myrinet etc. and the administration network (not shown) can be formed by Ethernet connecting the node managers 309.

Special nodes can be included in the system for providing a front end allowing administrative tasks or control functions to run the system. The front-end 350 does not need to be connected to the communication network, but just to the communication network. Via the front-end 350 node, which could be formed e.g. by a work station computer, a personal computer (PC) a laptop computer or any smart computing device, the modular computing system 300 can be administrated. Applications running on the modular computing system 300s can be scheduled, started, stopped and monitored. This can be done by batch processing, i.e. by executing a series of jobs on the modular computing system 300 without manual intervention, hence, non-interactive.

Besides running a series of jobs on the modular computing system 300 without manual intervention, the node managers may provide interactive computing, in which the application running on the modular computing system 300 accepts input from humans as it runs. This input may be provided via a work station computer, a personal computer (PC) a laptop computer or any smart computing device. In such a scenario the modular computing system 300 is accessible via e.g. the laptop computer, appearing as the laptop computer would have the computation power of the modular computing system 300. This is very useful for real time applications, which must respond within a time frame that the user senses as immediate or current. Also Big Data applications, which make voluminous amount of structured, semi structured and unstructured data accessible for mining information, can make use of such an arrangement. This is also true for cloud computing services having the modular computing system 300 as an underlying resource for the provision of computation power and storage.

The invention claimed is:

1. A modular computing system for performing computation of application programs, comprising:
 a plurality of different modules including at least a cluster module and a booster module, each of the plurality of different modules including a plurality of nodes; and
 a modular computing abstraction layer distributed across the plurality of nodes and providing (i) intra- and inter-module communication, (ii) a node and module operational state management function, and (iii) a resource management function for the plurality of nodes of the plurality of different modules;
 wherein the plurality of nodes represent hardware nodes.

2. The modular computing system according to claim 1, characterized in that the plurality of different modules are further formed by at least a storage module.

3. The modular computing system according to claim 1, characterized in that the modular computing abstraction layer is implemented by node managers provided in the plurality of nodes.

4. The modular computing system according to claim 3, characterized in that the node managers communicate with each other via an administration network.

5. The modular computing system according to claim 1, characterized in that the plurality of nodes communicate via a communication network.

6. The modular computing system according to claim 5, characterized in that the communication network is implemented using a shared memory communication.

7. The modular computing system according to claim 3, wherein communication between node managers is separated from communication between the plurality of different modules.

8. The modular computing system according to claim 3, wherein the node managers exchange information such that they each maintain a set of information about a status of each node and each interconnect between the plurality of nodes.

9. The modular computing system according to claim 8, wherein the set of information is used to dynamically adjust an operation of the system by assigning resources to the plurality of nodes dependent on the set of information.

10. A method for managing a modular computing system for performing computation of application programs, comprising:
 providing a plurality of different modules including at least a cluster module and a booster module, each of the plurality of different modules having a plurality of nodes representing hardware nodes;
 providing a modular computing abstraction layer distributed across the plurality of nodes; and
 providing, using the modular computing abstraction layer, (i) intra- and inter-node communication, (ii) a node and module operational state management function, and (iii) a resource management function for the plurality of nodes of the plurality of different modules.

11. The method for managing a modular computing system according to claim 10, further comprising:
    collecting, by a set of node managers, information about a status of the plurality of nodes; and
    assigning, by the set of node managers, resources to the plurality of nodes depending on the information.

12. The modular computing system according to claim 1, wherein the plurality of nodes are virtual nodes employed by the modular computing abstraction layer representing the hardware nodes.

13. The method for managing a modular computing system according to claim 10, further comprising:
    the modular computing abstraction layer employing the concept of virtual nodes representing hardware nodes.

* * * * *